April 19, 1927.
T. W. SHELLEY
1,625,337
TRICYCLE
Filed Oct. 14, 1925
2 Sheets-Sheet 1
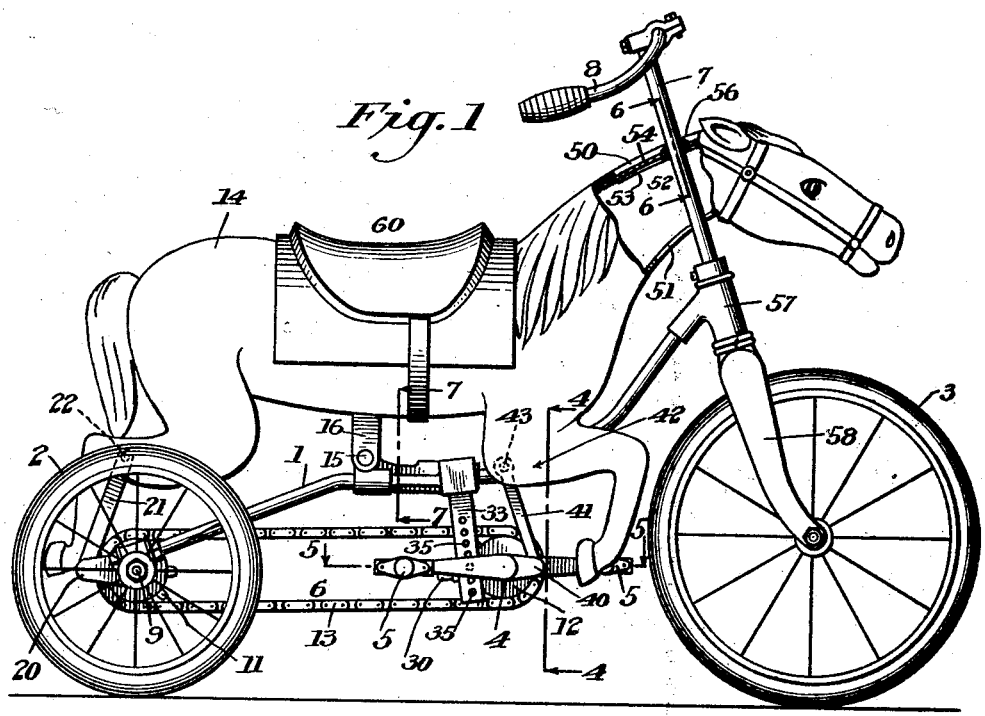
INVENTOR.
Thomas W. Shelley,
BY A. B. Bowman
ATTORNEY.

April 19, 1927.  T. W. SHELLEY  1,625,337
TRICYCLE
Filed Oct. 14, 1925  2 Sheets-Sheet 2
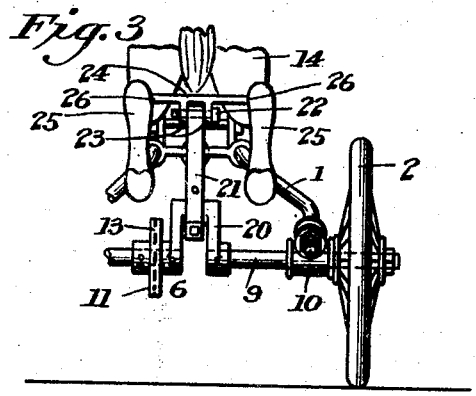
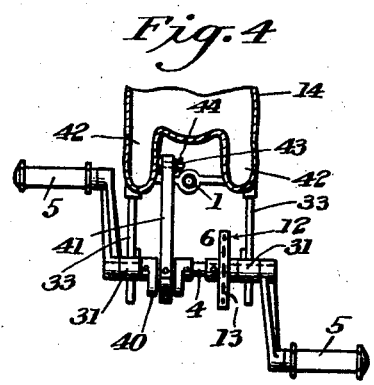
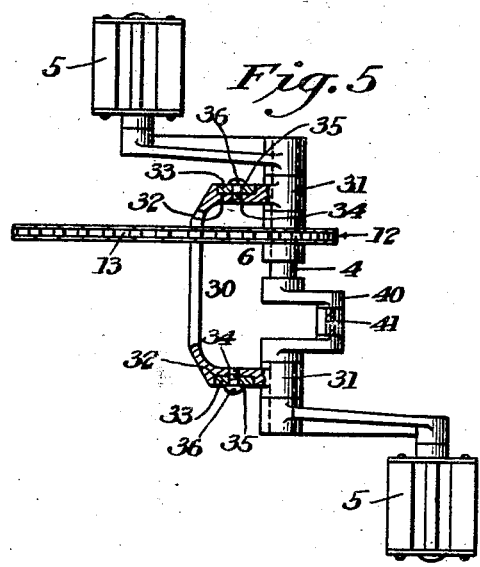
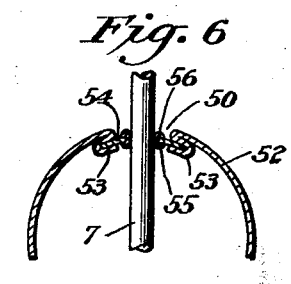
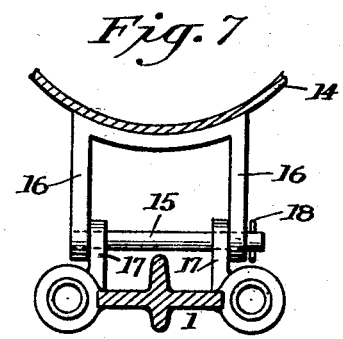
INVENTOR.
Thomas W. Shelley,
BY A. B. Bowman
ATTORNEY.

Patented Apr. 19, 1927.

1,625,337

UNITED STATES PATENT OFFICE.

THOMAS W. SHELLEY, OF LOS ANGELES, CALIFORNIA, ASSIGNOR TO WALLACE W. WHITECOTTON.

TRICYCLE.

Application filed October 14, 1925. Serial No. 62,356.

This invention relates to tricycles, and is an improvement over the tricycle covered by United States Letters Patent No. 1,519,493 of Dec. 16, 1924.

One of the objects of the invention is to provide a tricycle on which a simulated animal, such as a horse is mounted to rock regularly and smoothly as the tricycle is pedaled by a child sitting on the horse, and which is constructed with improved steering means whereby the device may be easily and safely guided by the child and is enabled to make sharp turns.

Another object is to provide a device of the character stated, constructed with improved means for adjusting its pedals to the length of the legs of the child using the device.

Other objects and advantages will appear hereinafter.

The invention consists in the novel features of construction, combination of elements and arrangement of parts hereinafter more fully described and claimed.

The invention is illustrated in the annexed drawing which forms a part of this specification and in which, Fig. 1 is a side elevation of the tricycle showing the horse in intermediate position.

Fig. 2 is a plan view of the device.

Fig. 3 is a fragmentary rear elevation of the tricycle.

Fig. 4 is a fragmentary transverse vertical section of the tricycle taken on line 4—4 of Fig. 1.

Fig. 5 is a horizontal section taken on line 5—5 of Fig. 1 showing the pedal supporting and adjusting means.

Fig. 6 is a transverse vertical section taken on line 6—6 of Fig. 1 showing the slot closing means.

Fig. 7 is a sectional view on an enlarged scale through 7—7 of Fig 1.

In the drawings 1 indicates the frame, 2 the rear wheels, 3 the front wheel, 4 the pedal shaft, 5 the pedals, 6 the transmission, 7 the steering post, and 8 the handle bars of a tricycle.

The rear axle 9 of the tricycle is journaled in bearings 10 on the rear end of the frame 1 and the rear wheels 2 are secured on the ends of said axle. The transmission 6 comprises a sprocket 11 on the rear axle 9, a sprocket 12 on the pedal shaft 4 and a chain 13 extending over said sprockets.

A simulated animal, such as a horse 14 is pivotally mounted on the frame 1 by means of a pivot bolt 15 extending through lugs 16, depending from the belly of the horse, and through lugs 17 upstanding from the frame 1, there being a cotter pin 18 extended through the outer end of said pivot to hold it in the lugs.

A crank 20 is provided on the rear axle 9 intermediate its ends to which the lower end of a connecting rod 21 is connected, the upper end of said rod being connected to the rear end of the horse 14 by means of a pivot bolt 22 extending through said upper end of the rod and through a pair of lugs 23 depending from a bar 24 which extends transversely between the hind legs 25 of the horse 14 and is secured at its ends to said legs as at 26.

A pedal frame 30 is formed with a pair of bearings 31, in which is journaled the pedal shaft 4, and with a pair of recesses 32 in which are received a pair of spaced arms 33 depending from the tricycle frame 1. The pedal frame 30 is provided with a pair of screw threaded openings 34 and the arms 33 are each provided with a plurality of superimposed holes 35. Screws 36 are inserted through any of the holes 35 in arms 33 and screwed into the openings 35, whereby the pedal frame, shaft 4 and pedals 5 may be supported at different elevations, so that children with legs of different lengths may sit on the horse 14 with their feet on the pedals 5 in order to pedal the tricycle.

On the pedal shaft 4 is provided a crank 40 to which the lower end of a connecting rod 41 is connected, the upper end of said rod being pivotally connected to the inside of one of the front legs 42 of the horse 14 by means of a stud 43, extending from the inside of said leg through said upper end of said rod, and a cotter pin 44 extending through the end of said stud to hold said upper end of said rod on said stud.

The horse 14 may be formed of sheet metal and is provided with a pair of longitudinal slots 50 and 51 in the upper and lower walls respectively of the horse's neck 52, which slots are aligned with each other and are positioned so that the steering post 7 extends through the same. The upper wall of the horse's neck is bent, at the side edges of slot 50 backwardly and inwardly upon itself and then forwardly in the form of guideways 53 in which slide the side edges of a plate 54 provided with an opening 55 around the edge of which is fitted a rubber collar 56 through which the steering post 7 extends in sliding contact. The steering post 7 is journaled in a bearing 57 on the forward end of frame 1 and is secured at its lower end to the upper end of the front wheel fork 58 in the lower end of which the front wheel 3 is journaled. The bearing 57 rests upon the upper end of the fork 58.

The horse 14 is provided with a saddle 60 in which a child may sit with his feet on the pedals 5 so that he may pedal the tricycle along through the medium of the pedals 5, shaft 4, pedal sprocket 12, chain 13, rear wheel sprocket 11, rear axle 9 and rear wheels 2. As the tricycle thus travels along the horse 14 is caused to rock on its pivot 15 by means of cranks 20 and 40 and connecting rods 21 and 41, giving the child a novel and pleasant sensation and much amusement. The two cranks and connecting rods cause the horse to rock regularly and smoothly. As the horse rocks the steering post 7 travels first in one direction and then in the other in the slots 50 and 51, and in doing so causes the plate 54 to slide in the guideways 53 and close the slot 50 at all times so that the child may not get his fingers caught in the slot between the walls thereof and the steering post 7, thus avoiding injury in such manner to the child's fingers.

I claim:

1. In a tricycle, a frame, wheels on which said frame is mounted, a steering post rotatably mounted on said frame, another wheel mounted in connection with said steering post, a body simulating an animal pivotally mounted on said frame, means in connection with said first mentioned wheels and said body for rocking the latter, said body being provided with a slot through which said steering post extends, and means in connection with said steering post and said body for covering said slot during the movement of said body.

2. In a tricycle, a simulated animal pivotally mounted on the tricycle frame, means whereby said animal is caused to rock as the tricycle is pedaled along, the head portion of the simulated animal being provided with a longitudinal slot through which the steering post of the tricycle extends, and handle bars on the upper end of said steering post above the animal, a plate slidably mounted in the head portion of the animal and closing the upper slot, and through which plate said steering post slidably extends.

3. In a tricycle, a simulated animal pivotally mounted on the tricycle frame, means whereby said animal is caused to rock as the tricycle is pedaled along, the head portion of the simulated animal being provided with a longitudinal slot through which the steering post of the tricycle extends, and handle bars on the upper end of said steering post above the animal, a plate slidably mounted in the neck portion of the animal and closing the upper slot therein, said plate having an opening therein and a flexible collar fitted in said opening through which collar the steering post of the vehicle extends.

4. In a tricycle, a simulated animal pivotally mounted on the tricycle frame, means whereby said animal is caused to rock as the tricycle is pedaled along, the head portion of the simulated animal being provided with longitudinal slots through which the steering post of the tricycle extends, and handle bars on the upper end of said steering post above the animal and means for closing the upper slot in all positions of the animal.

In testimony whereof, I have hereunto set my hand at Los Angeles, California, this 29th day of September 1925.

THOMAS W. SHELLEY.